(12) United States Patent
Tsukamoto et al.

(10) Patent No.: US 11,949,291 B2
(45) Date of Patent: Apr. 2, 2024

(54) MOTOR HAVING ROTOR WITH DIFFERENT CORE REGIONS, COMPRESSOR, AND AIR CONDITIONER HAVING THE MOTOR

(71) Applicant: Mitsubishi Electric Corporation, Tokyo (JP)

(72) Inventors: Emi Tsukamoto, Tokyo (JP); Masahiro Nigo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 396 days.

(21) Appl. No.: 17/427,138

(22) PCT Filed: Feb. 22, 2019

(86) PCT No.: PCT/JP2019/006751
§ 371 (c)(1),
(2) Date: Jul. 30, 2021

(87) PCT Pub. No.: WO2020/170418
PCT Pub. Date: Aug. 27, 2020

(65) Prior Publication Data
US 2022/0103030 A1   Mar. 31, 2022

(51) Int. Cl.
*H02K 1/276*  (2022.01)
*F25B 31/02*  (2006.01)
(Continued)

(52) U.S. Cl.
CPC .......... *H02K 1/276* (2013.01); *F25B 31/026* (2013.01); *H02K 1/16* (2013.01); *H02K 1/27* (2013.01);
(Continued)

(58) Field of Classification Search
CPC ........ H02K 21/14; H02K 21/16; H02K 21/38; H02K 21/46; H02K 1/02; H02K 1/32;
(Continued)

(56) References Cited

U.S. PATENT DOCUMENTS

| 6,891,300 B2 * | 5/2005 | Noda ....................... H02K 1/04 |
| | | 310/216.106 |
| 2005/0035677 A1 * | 2/2005 | Evans .................... H02K 1/276 |
| | | 310/156.35 |

(Continued)

FOREIGN PATENT DOCUMENTS

| JP | 2000-116044 A | 4/2000 |
| JP | 2003-274591 A | 9/2003 |

(Continued)

OTHER PUBLICATIONS

International Search Report dated May 21, 2019, issued in corresponding International Application No. PCT/JP2019/006751 (and English Machine Translation).

*Primary Examiner* — Tran N Nguyen
(74) *Attorney, Agent, or Firm* — POSZ LAW GROUP, PLC

(57) ABSTRACT

A motor includes a stator core having an annular shape about an axis, a coil wound on the stator core, and a rotor core disposed on an inner side of the stator core in a radial direction about the axis. The rotor core has a stacked body in which a plurality of steel laminations are stacked in a direction of the axis, and a magnet insertion hole famed in the stacked body. The rotor core has a length in the direction of the axis longer than that of the stator core. A magnet is inserted in the magnet insertion hole. The rotor core has a first region where the magnet is inserted in the magnet insertion hole and a second region where the magnet is not inserted in the magnet insertion hole, in the direction of the axis. At least one steel lamination in the second region of the (Continued)

rotor core has an opening area smaller than an opening area of each steel lamination in the first region of the rotor core.

10 Claims, 14 Drawing Sheets

(51) Int. Cl.
    *H02K 1/16*     (2006.01)
    *H02K 1/27*     (2022.01)
    *H02K 3/34*     (2006.01)
    *H02K 3/52*     (2006.01)
    *H02K 21/16*     (2006.01)

(52) U.S. Cl.
    CPC ............... *H02K 3/34* (2013.01); *H02K 3/345* (2013.01); *H02K 3/522* (2013.01); *H02K 21/16* (2013.01); *F25B 2500/13* (2013.01)

(58) Field of Classification Search
    CPC ........... H02K 1/24; H02K 1/246; H02K 1/28; H02K 1/27; H02K 1/2374; H02K 1/276; H02K 1/278
    See application file for complete search history.

(56)     References Cited

U.S. PATENT DOCUMENTS

2008/0224558 A1*   9/2008   Ionel .................... H02K 1/2766
                                                  310/156.57
2014/0021820 A1    1/2014   Kondou et al.

FOREIGN PATENT DOCUMENTS

| JP | 2006-280021 A | 10/2006 |
| JP | 2005-307845 A | 5/2007 |
| JP | 2013-034362 A | 2/2013 |

\* cited by examiner

MOTOR HAVING ROTOR WITH DIFFERENT CORE REGIONS, COMPRESSOR, AND AIR CONDITIONER HAVING THE MOTOR

CROSS REFERENCE TO RELATED APPLICATION

This application is a U.S. National Stage Application of International Patent Application No. PCT/JP2019/006751 filed on Feb. 22, 2019, the disclosures of which are incorporated herein by reference.

TECHNICAL FIELD

The present invention relates to a motor, a compressor, and an air conditioner.

BACKGROUND

In a compressor, it is known that repetition of sucking and compression of refrigerant causes a load on a motor to pulsate. In particular, as a size of the motor is reduced, an inertia of a rotor decreases. This makes the rotation of the rotor unstable, which may cause vibration and noise.

Therefore, a motor has been proposed in which a length of a rotor core in the axial direction is longer than a length of a stator core in the axial direction (see, for example, Patent Reference 1).

PATENT REFERENCE

[PATENT REFERENCE 1] Japanese Patent Application Publication No. 2003-274591 (see FIG. 1)

However, in order to reduce a size of the motor, it is desired to further increase the inertia of the rotor and thereby stabilize the rotation of the rotor.

SUMMARY

The present invention is intended to solve the above described problems, and an object of the present invention is to stabilize the rotation of the motor by increasing the inertia of the rotor.

According to one aspect of the present invention, there is provide a motor including a stator core having an annular shape about an axis, a coil wound on the stator core, a rotor core disposed on an inner side of the stator core in a radial direction about the axis, the rotor core having a stacked body in which a plurality of steel laminations are stacked in a direction of the axis and a magnet insertion hole famed in the stacked body, the rotor core having a length in the direction of the axis longer than that of the stator core, and a magnet inserted in the magnet insertion hole. The rotor core has a first region where the magnet is inserted in the magnet insertion hole and a second region where the magnet is not inserted in the magnet insertion hole, in the direction of the axis. An opening area of at least one steel lamination in the second region of the rotor core is smaller than an opening area of each steel lamination in the first region of the rotor core.

According to the present disclosure, there is provide a motor including a stator core having an annular shape about an axis, a coil wound on the stator core, a rotor core disposed on an inner side of the stator core in a radial direction about the axis, the rotor core having a stacked body in which a plurality of steel laminations are stacked in a direction of the axis and a magnet insertion hole famed in the stacked body, the rotor core having a length in the direction of the axis longer than that of the stator core, and a magnet inserted in the magnet insertion hole. The rotor core has a first region where the magnet is inserted in the magnet insertion hole and a second region where the magnet is not inserted in the magnet insertion hole, in the direction of the axis. Each of the steel laminations in the first region has one or more slits on an outer side of the magnet insertion hole in the radial direction. The at least one steel lamination in the second region has no slit or has one or more slits, a number or area of which is smaller than that of the one or more slits of each of the steel laminations in the first region, on the outer side of the magnet insertion hole in the radial direction.

According to the present disclosure, there is provide a motor including a stator core having an annular shape about an axis, a coil wound on the stator core, a rotor core disposed on an inner side of the stator core in a radial direction about the axis, the rotor core having a stacked body in which a plurality of steel laminations are stacked in a direction of the axis and a magnet insertion hole famed in the stacked body, the rotor core having a length in the direction of the axis longer than that of the stator core, and a magnet inserted in the magnet insertion hole. The rotor core has a first region where the magnet is inserted in the magnet insertion hole and a second region where the magnet is not inserted in the magnet insertion hole, in the direction of the axis. Each of the steel laminations in the first region has one or more holes on an inner side of the magnet insertion hole in the radial direction. The at least one steel lamination in the second region has no hole or has one or more holes, a number or area of which is smaller than that of the one or more openings of each of the steel laminations in the first region, on the inner side of the magnet insertion hole in the radial direction.

DETAILED DESCRIPTION

Embodiments of the present invention will be described in detail below with reference to the figures. The present invention is not limited to these embodiments.

First Embodiment (Configuration of Motor)

Figure 1:
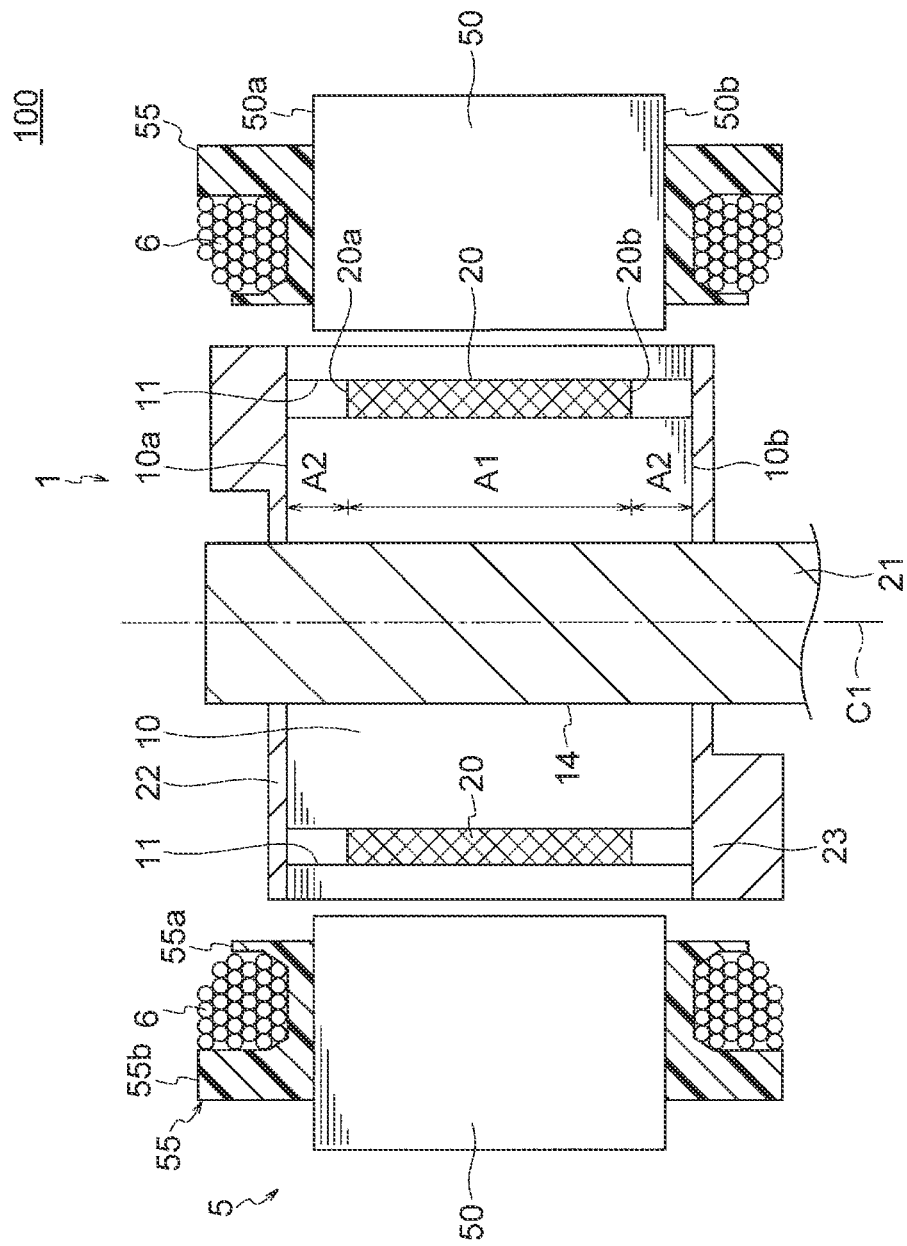
FIG. 1 is a longitudinal-sectional view illustrating a motor of a first embodiment.

FIG. 1 is a longitudinal-sectional view illustrating a motor 100 of a first embodiment. The motor 100 illustrated in FIG. 1 is called an inner-rotor type motor. The motor 100 includes a rotor 1 having a shaft 21 as a rotation shaft, and a stator 5 provided so as to surround the rotor 1. An air gap of, for example, 0.3 to 1.0 mm is famed between the rotor 1 and the stator 5.

Hereinafter, a direction of an axis C1, which is a center of rotation of the shaft 21, is referred to as an "axial direction". A radial direction about the axis C1 is referred to as a "radial direction". A circumferential direction about the axis C1 is referred to as a "circumferential direction" and indicated by an arrow S in FIG. 2 and the like. A sectional view on a plane parallel to the axis C1 is referred to as a "longitudinal-sectional view", whereas a sectional view on a plane perpendicular to the axis C1 is referred to as a "cross-sectional view".

Figure 2:
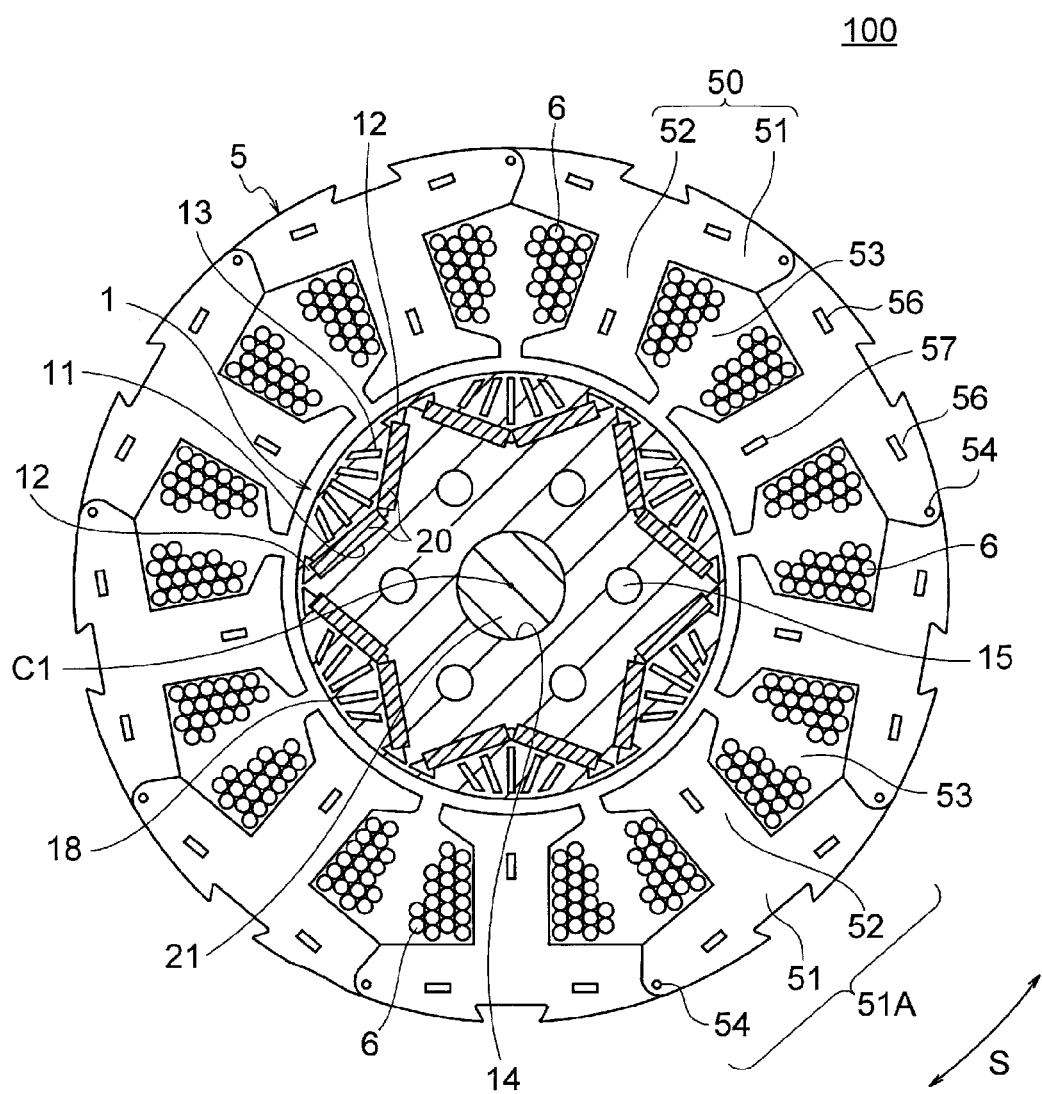
FIG. 2 is a cross-sectional view illustrating the motor of the first embodiment.

FIG. 2 is a cross-sectional view illustrating the motor 100 of the first embodiment. In this regard, FIG. 2 is a cross-sectional view on a plane that passes through a first region A1 to be described later. As shown in FIG. 2, the rotor 1 has a rotor core 10 having a cylindrical shape about the axis C1, and permanent magnets 20 attached to the rotor core 10. The rotor core 10 is a stacked body of a plurality of steel laminations which are stacked in the axial direction and fixed integrally, for example, by crimping.

Each of the steel laminations is, for example, an electromagnetic steel sheet. The sheet thickness of each of the steel laminations is 0.1 to 0.7 mm, and is 0.35 mm in this example. A center hole 14 is famed at the center of the rotor core 10 in the radial direction. The above described shaft 21 is fixed to the center hole 14 by shrink-fitting, press-fitting, bonding, or the like. The rotor core 10 has an outer circumference 18 having an annular shape.

A plurality of magnet insertion holes 11 into which the permanent magnets 20 are inserted are famed along the outer circumference 18 of the rotor core 10. One magnet insertion hole 11 corresponds to one magnetic pole, and a space between adjacent magnet insertion holes 11 is an inter-pole portion. The number of magnet insertion holes 11 is six in this example. In other words, the number of magnetic poles is six. In this regard, the number of magnetic poles is not limited to six and only needs to be two or more. The magnet insertion hole 11 is famed in a V shape that is convex toward the inner side in the radial direction in a plane perpendicular to the axial direction.

Two permanent magnets 20 are inserted in each magnet insertion hole 11. The permanent magnet 20 is in the foam of a flat-plate and has a width in the circumferential direction of the rotor core 10 and a thickness in the radial direction.

The permanent magnet 20 is made of a rare earth magnet that contains, for example, neodymium (Nd), iron (Fe) and boron (B) as main components.

Each permanent magnet 20 is magnetized in the thickness direction. The two permanent magnets 20 inserted in the same magnet insertion hole 11 have the same magnetic poles on the outer side in the radial direction. The permanent magnets 20 inserted in the adjacent magnet insertion holes 11 have opposite magnetic poles on the outer side in the radial direction. Each magnet insertion hole 11 may have, for example, a linear shape. The number of permanent magnets 20 inserted in each magnet insertion hole 11 may be one or three or more.

In the rotor core 10, a flux barrier 12 as an aperture is famed on each of both ends of the magnet insertion hole 11 in the circumferential direction. A thin wall portion is famed between the flux barrier 12 and the outer circumference 18 of the rotor core 10. The thin wall portion is thin enough to suppress short-circuit magnetic flux flowing between adjacent magnetic poles. The width of the thin wall portion is equivalent to the sheet thickness of the steel lamination, and is 0.35 mm in this example.

In the rotor core 10, holes 15 are foiled on the inner side in the radial direction with respect to the magnet insertion holes 11. Each hole 15 is used as an airhole through which the refrigerant passes or as a hole through which a jig is inserted. In this example, six holes 15 are famed at positions in the circumferential direction corresponding to the inter-pole portions, but the number and arrangement of the holes 15 may vary.

As illustrated in FIG. 1, a balance weight 22 made of brass, for example, is fixed to an end of the rotor core 10 in the axial direction, and a balance weight 23 made of brass, for example, is fixed to the other end of the rotor core 10 in the axial direction. The balance weights 22 and 23 are provided to improve a rotational balance of the rotor 1 and to increase an inertia of the rotor 1.

The stator 5 includes a stator core 50 and coils 6 wound on the stator core 50. The stator core 50 is famed of a plurality of steel laminations, which are stacked in the axial direction and fixed integrally, for example, by crimping. Each of the steel laminations is, for example, an electromagnetic steel sheet. The sheet thickness of each of the steel laminations is 0.1 to 0.5 mm, and is 0.35 mm in this example.

The stator core 50 has a yoke 51 having an annular shape about the axis C1 and a plurality of teeth 52 extending inward in the radial direction from the yoke 51. The teeth 52 are disposed at regular intervals in the circumferential direction. The number of teeth 52 is nine in this example. In this regard, the number of teeth 52 is not limited to nine and only needs to be two or more. Slots 53 serving as spaces to accommodate the coils 6 are each foamed between two teeth 52 adjacent to each other in the circumferential direction. The number of slots 53 is the same as the number of teeth 52, which is nine in this example. That is, the ratio of the number of magnetic poles to the number of slots of the motor 100 is 2:3.

Crimping portions 56 are foiled in the yoke 51, and a crimping portion 57 is famed in the tooth 52. The crimping portions 56 and 57 are portions by which the steel laminations of the stator core 50 are integrally fixed. In this regard, the positions of the crimping portions are not limited to these positions.

The stator core 50 herein has a configuration in which a plurality of split cores 5A each including one tooth 52 are connected together in the circumferential direction. The split cores 5A are connected to each other at connecting portions 54 provided at an end of the yoke 51 on the outer circumferential side. This configuration makes it possible to wind the coil 6 around each tooth 52 in a state where the stator core 50 is expanded in a strip shape. In this regard, the stator core 50 is not limited to a structure in which the split cores 5A are connected.

The coil 6 is formed of a magnet wire wound around each tooth 52 in a concentrated winding. A wire diameter of the magnet wire is, for example, 1.0 mm. The number of turns of the coil 6 around one tooth 52 is, for example, 80 turns. The number of turns and the wire diameter of the coil 6 are determined according to required specifications of the motor 100 such as the number of rotations and torque, a supply voltage, or a sectional area of the slot 53. The coils 6 have winding portions of three phases, i.e., a U-phase, a V-phase, and a W-phase, which are connected in Y-connection.

An insulating portion 55 (FIG. 1) made of resin such as polybutylene terephthalate (PBT) is provided between the stator core 50 and the coil 6. The insulating portion 55 is famed by attaching a molded body of resin to the stator core 50 or by integrally molding the stator core 50 with resin.

On each of the end surfaces of the stator core 50 in the axial direction, the insulating portion 55 has wall portions 55a and 55b (FIG. 1) on the inner and outer sides in the radial direction of the coil 6, respectively. The wall portions 55a and 55b guide the coil 6 from both sides in the radial direction. Although not illustrated in FIG. 2, an insulating film having a thickness of 0.1 to 0.2 mm and made of resin such as polyethylene terephthalate (PET) is provided on an inner surface of the slot 53.

As illustrated in FIG. 1, a length of the rotor core 10 in the axial direction is longer than a length of the stator core 50 in the axial direction. In other words, a stacking height of the steel laminations constituting the rotor core 10 is higher than a stacking height of the steel laminations constituting the stator core 50.

The rotor core 10 protrudes from both sides of the stator core 50 in the axial direction. In other words, both end surfaces 10a and 10b of the rotor core 10 in the axial direction are located on both sides in the axial direction with respect to both end surfaces 50a and 50b of the stator core 50 in the axial direction.

The magnet insertion hole 11 of the rotor core 10 is famed from the first end surface 10a to the second end surface 10b of the rotor core 10.

Meanwhile, a length of the permanent magnet 20 in the axial direction is shorter than a length of the magnet insertion hole 11 in the axial direction. In other words, both end surfaces 20a and 20b of the permanent magnet 20 in the axial direction are located on the inner sides in the axial direction with respect to both end surfaces 10a and 10b of the rotor core 10. Therefore, there are portions at both ends of the magnet insertion hole 11 in the axial direction where the permanent magnet 20 is not inserted.

That is, the rotor core 10 has the first region A1 where the permanent magnet 20 is inserted in the magnet insertion hole 11 and second regions A2 where the permanent magnet 20 is not inserted in the magnet insertion hole 11. The first region A1 is also referred to as a magnet insertion region. Each second region A2 is also referred to as a magnet non-insertion region.

In the first embodiment, the steel laminations in the first region A1 and the steel laminations in the second regions A2 of the rotor core 10 have different shapes as follows.

Figure 3:
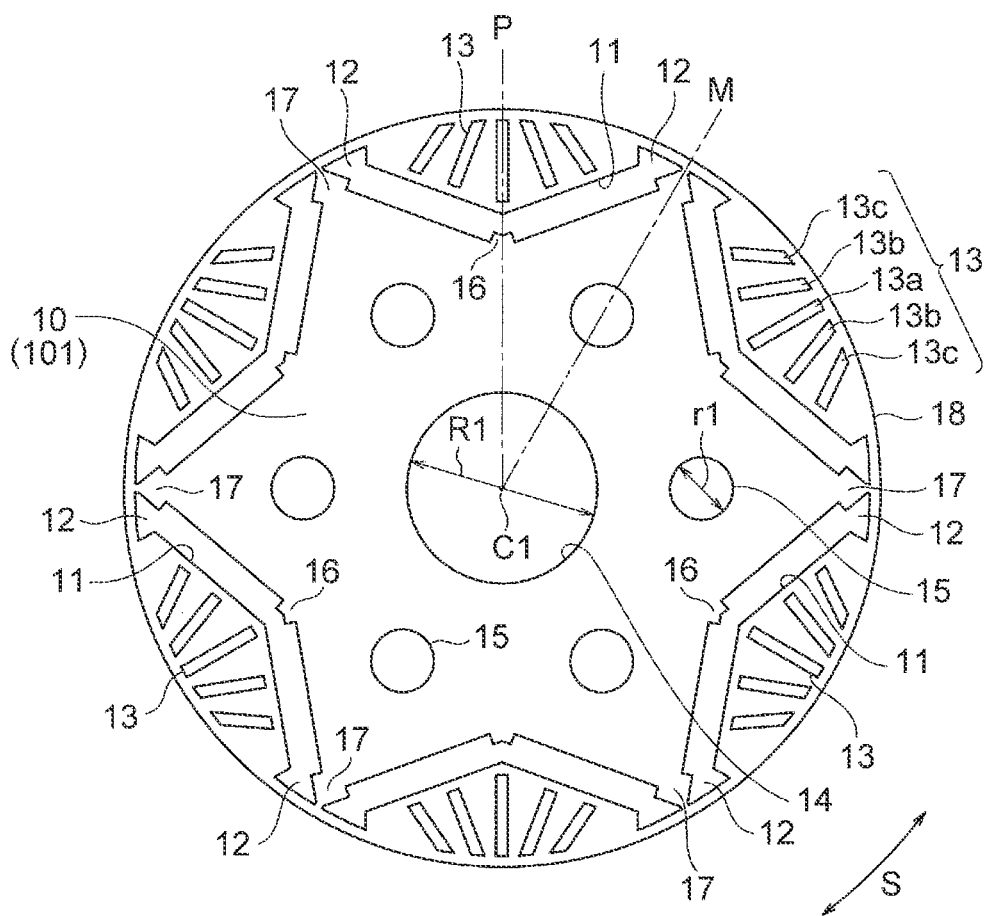
FIG. 3 is a cross-sectional view illustrating a steel lamination in a first region of a rotor core of the first embodiment.

FIG. 3 is a diagram illustrating the steel lamination 101 in the first region A1 of the rotor core 10. The center hole 14 having an inner diameter R1 is famed at the center of the steel lamination 101 in the radial direction. A plurality of magnet insertion holes 11 are famed along the outer circumference 18 of the steel lamination 101. Each of the magnet insertion holes 11 is famed in the V shape that is convex toward the inner side in the radial direction as described above.

A positioning portion 16, which is a protrusion located between two permanent magnets 20, is famed at the center of the magnet insertion hole 11 in the circumferential direction. A positioning portion 17 is famed at each end of the magnet insertion hole 11 in the circumferential direction, so that the permanent magnet 20 is positioned between the positioning portions 16 and 17. The number and arrangement of the magnet insertion holes 11 are as described with reference to FIG. 2.

The holes 15 each having an inner diameter r1 are foamed on the inner sides in the radial direction with respect to the magnet insertion holes 11 of the steel lamination 101. The number and arrangement of the holes 15 are as described with reference to FIG. 2.

At least one slit 13 is formed between the magnet insertion hole 11 and the outer circumference 18 of the steel lamination 101. The slit 13 is famed to reduce an increase in iron loss due to rotating magnetic field from the stator 5 and to reduce vibration and noise due to a magnetic attraction force. In this example, a plurality of slits 13 are symmetrically disposed with respect to a pole center, i.e., a center of the magnet insertion hole 11 in the circumferential direction.

More specifically, the slits 13 include a slit 13a located at the pole center, two slits 13b located on both sides of the slit 13a in the circumferential direction, and two slits 13c located on both sides of the slits 13b in the circumferential direction. In this regard, the number and arrangement of the slits 13 may vary.

A total area of the center hole 14, the magnet insertion holes 11, the holes 15, and the slits 13 famed in each steel lamination 101 is referred to as an opening area of the steel lamination 101.

Figure 4:
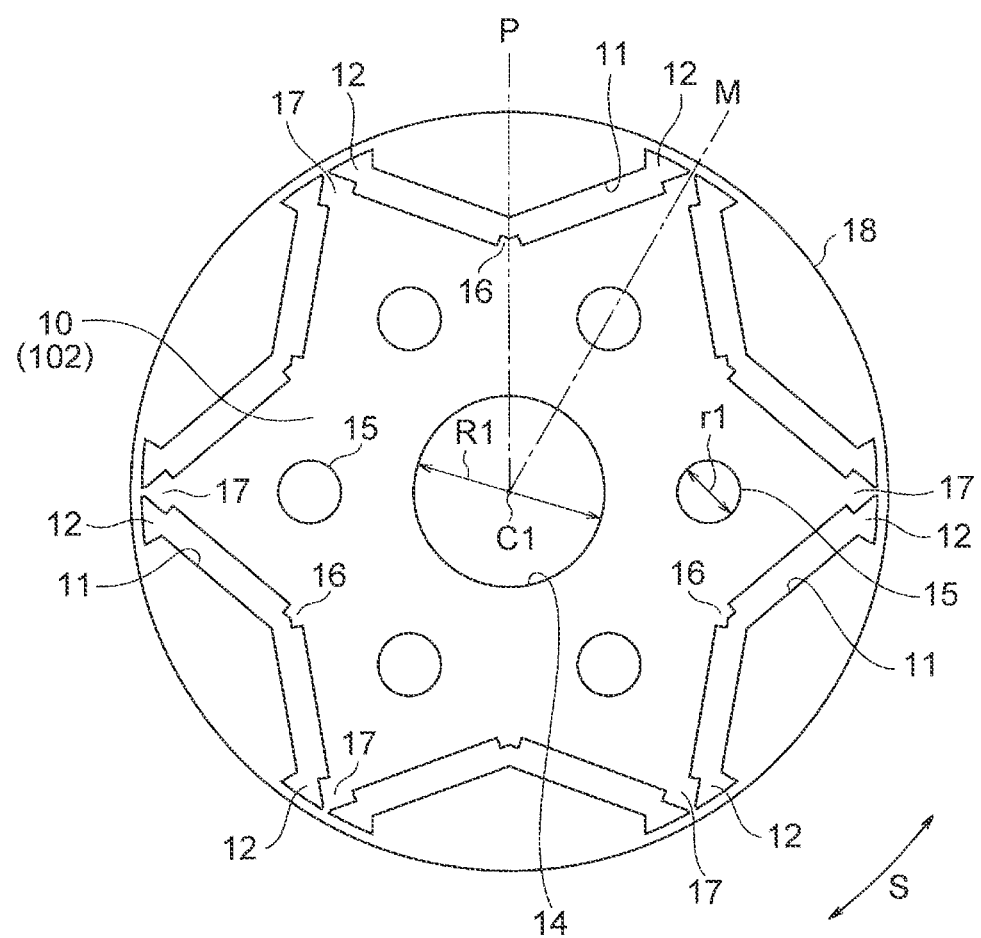
FIG. 4 is a cross-sectional view illustrating a steel lamination in a second region of the rotor core of the first embodiment.

FIG. 4 is a diagram illustrating the steel lamination 102 in the second region A2 of the rotor core 10. The center hole 14 having an inner diameter R1 is famed at the center of the steel lamination 102 in the radial direction. A plurality of magnet insertion holes 11 are famed along the outer circumference 18 of the steel lamination 102. The shape, number and arrangement of the magnet insertion holes 11 are as described with reference to FIG. 2. The holes 15 each having an inner diameter r1 are famed on the inner sides in the radial direction with respect to the magnet insertion holes 11 of the steel lamination 102. The number and arrangement of the holes 15 are as described with reference to FIG. 2.

However, a slit such as the slit 13 shown in FIG. 3 is not provided between the magnet insertion hole 11 and the outer circumference 18 of the steel lamination 102.

A total area of the center hole 14, the magnet insertion holes 11, and the holes 15 famed in each steel lamination 102 is referred to as an opening area of the steel lamination 102.

The opening area of each steel lamination 102 is smaller than the opening area of each steel lamination 101 by the area of the slits 13. Thus, a proportion of iron in the steel lamination 102 is greater than that in the steel lamination 101. As a result, a weight per sheet of the steel laminations 102 is heavier than a weight per sheet of the steel laminations 101.

Thus, since the rotor core 10 is famed of the steel laminations 101 and the steel laminations 102, the entire weight of the rotor core 10 can be made heavier than that when the rotor core 10 is famed of only the steel laminations 101.

In a manufacturing process of the rotor 1 of the first embodiment, the rotor core 10 is famed by stacking the steel laminations in the second region A2 on the lower side in FIG. 1, the steel laminations 101 in the first region A1, and the steel laminations 102 in the second region A2 on the upper side in FIG. 1, in this order. Thereafter, the permanent magnets 20 are inserted in the magnet insertion holes 11 in the first region A1 of the rotor core 10.

(Function)

A function of the first embodiment will be described. In the compressor in which the motor 100 is used, sucking and compression of refrigerant are repeated, causing a load on the motor 100 to pulsate. In particular, in the compact motor 100, the rotor 1 is small in size and light in weight, and thus the inertia of the rotor 1 is small. Therefore, the rotation of the rotor 1 may be unstable due to load pulsation.

In order to increase the inertia of the rotor 1, it is necessary to increase the size of the rotor core 10. However, in order to increase the outer diameter of the rotor core 10, it is also necessary to increase the inner diameter of the stator core 50 surrounding the rotor core 10.

When the inner diameter of the stator core 50 is increased, the area of the slots 53 decreases, and the accommodation spaces of the coils 6 are reduced. Thus, the cross-sectional area of the conductors of the coils 6 need to be reduced, which increases copper loss and leads to reduction in the motor efficiency. In addition, when both the inner and outer diameters of the stator core 50 are increased, the size of the compressor increases.

Therefore, it is conceivable to increase the inertia of the rotor 1 by employing a configuration in which the rotor core 10 protrudes, i.e., overhang, from the stator core 50 in the axial direction. However, in order to further reduce the size of the motor 100, it is necessary to further increase the inertia of the rotor 1.

In the first embodiment, as described above, the opening area of each steel lamination 102 in the second region A2 of the rotor core 10 is smaller than the opening area of each steel lamination 101 in the first region A1 of the rotor core 10. That is, the weight per sheet of the steel laminations 102 is heavier than the weight per sheet of the steel laminations 101. Therefore, the entire weight of the rotor core 10 can be made heavier than that when the rotor core 10 is famed of only the steel laminations 101.

If the weight of the cylindrical rotor core 10 is expressed as "m", the radius of the rotor core 10 is expressed as "r", the length of the rotor core 10 in the axial direction is expressed as "h", and the density of the rotor core 10 is expressed as "ρ", the inertia I of a cylinder about the axis C1 is expressed as $I=1/2 \times (mr^2)$. Assuming that the radius r is a constant value, the inertia of the rotor core 10 is proportional to the weight m.

In the first embodiment, the above described configuration allows the weight of the rotor core 10 to be made heavier, and thus the inertia of the rotor core 10 is increased, so that the rotation of the motor 100 can be stabilized.

Since the length of the permanent magnet 20 in the axial direction is shorter than the length of the rotor core 10 in the axial direction, the magnetic flux emerging from the permanent magnets 20 and entering the end surfaces 10a and 10b of the rotor core 10 is reduced. As a result, the magnetic flux contributing to the generation of driving force can be increased. Thus, the motor efficiency can be improved.

By decreasing the length of the permanent magnets 20 in the axial direction, the use amount of magnet material can be reduced, and thus the manufacturing cost can be reduced.

In the first region A1 of the rotor core 10, the amount of change in the magnetic flux due to the rotating magnetic field of the coils 6 of the stator 5 is large. This may cause iron loss in the rotor core 10, or may cause vibration and noise due to the magnetic attraction force. In contrast, in the second region A2, since the permanent magnets 20 are not inserted in the magnet insertion holes 11, the amount of change in the magnetic flux is smaller than in the first region A1. Thus, the above described iron loss, vibration, and noise are less likely to occur.

Therefore, in the first embodiment, the steel laminations 101 in the first region A1 are provided with the slits 13, while the steel laminations 102 in the second region A2 are provided with no slit 13. Thus, the inertia of the rotor core 10 can be increased while suppressing the occurrence of iron loss and the occurrence of vibration and noise. This makes it possible to stabilize the rotation of the rotor core 10 against load pulsation in the compressor.

Although the configuration in which the steel laminations 102 in the second region A2 have no slit 13 has been described herein, this embodiment is not limited to such a configuration.

Figure 5A:
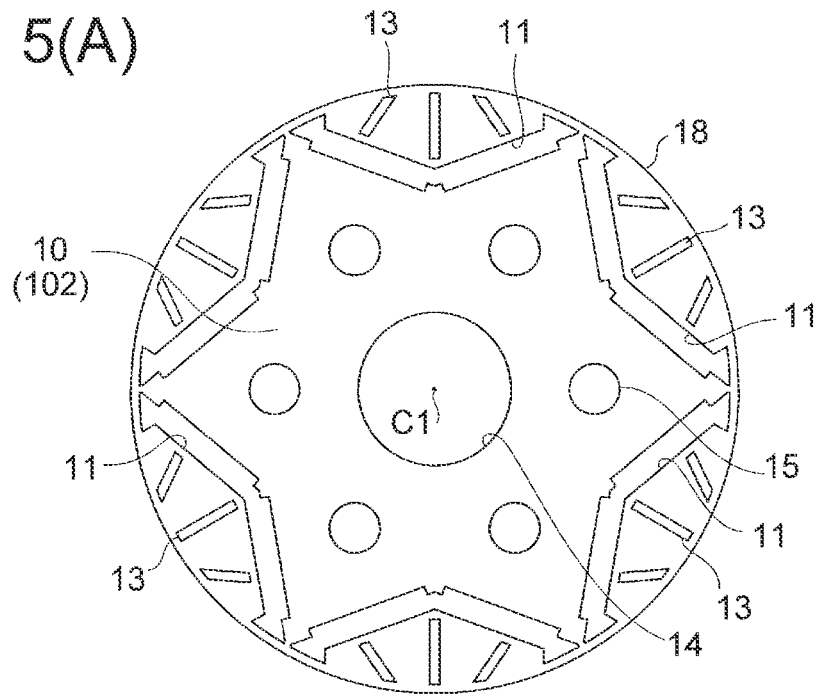
FIGS. 5(A) and 5(B) are diagrams illustrating other configuration examples of the steel lamination in the second region of the rotor core of the first embodiment.
Figure 5B:
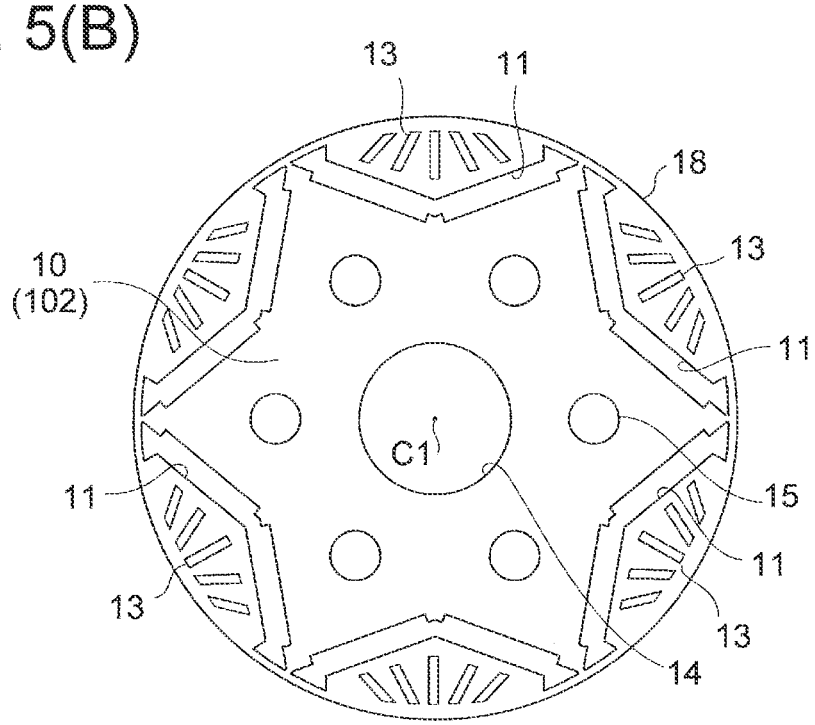

For example, as illustrated in FIG. 5(A), the steel lamination 102 in the second region A2 of the rotor core 10 may have fewer slits 13 than the slits 13 of the steel lamination 101 (FIG. 3). Further, as illustrated in FIG. 5(B), the steel lamination 102 in the second region A2 of the rotor core 10 may have slits 13 having a smaller area than the slits 13 (FIG. 3) in the steel lamination 101.

That is, it is sufficient that the total area of the slits 13 of the steel lamination 102 in the second region A2 is smaller than the total area of the slits 13 of the steel lamination 101 in the first region A1. In other words, it is sufficient that the opening area of the steel lamination 102 in the second region A2 is smaller than the opening area of the steel lamination 101 in the first region A1.

A description has been made to the case where the opening area of each steel lamination 102 in the second region A2 is smaller than the opening area of each steel lamination 101 in the first region A1. However, it is sufficient that the opening area of at least one steel lamination 102 in the second region A2 is smaller than the opening area of each steel lamination 101 in the first region A1.

Effects of Embodiment

As described above, in the first embodiment, the length of the rotor core 10 in the axial direction is longer than the length of the stator core 50 in the axial direction. The rotor core 10 has the first region A1 where the permanent magnets 20 are inserted in the magnet insertion holes 11 and the second region A2 where the permanent magnets 20 are not inserted in the magnet insertion holes 11. Further, the opening area of at least one steel lamination 102 in the second region A2 of the rotor core 10 is smaller than the opening area of each steel lamination 101 in the first region A1. Therefore, the inertia of the rotor core 10 can be increased by increasing the weight of the rotor core 10. This makes it possible to stabilize the rotation of the motor 100 against load pulsation and to thereby suppress vibration and noise.

Further, at least one steel lamination 102 in the second region A2 of the rotor core 10 has no slit 13 or has one or more slits 13, the number or area of which is smaller than that of the one or more slits 13 of each steel lamination 101 in the first region A1. Thus, the effect of suppressing iron loss or the like can be achieved by using the slits 13, and the inertia of the rotor core 10 can be increased, so that vibration and noise can be reduced.

Modification

Figure 6:
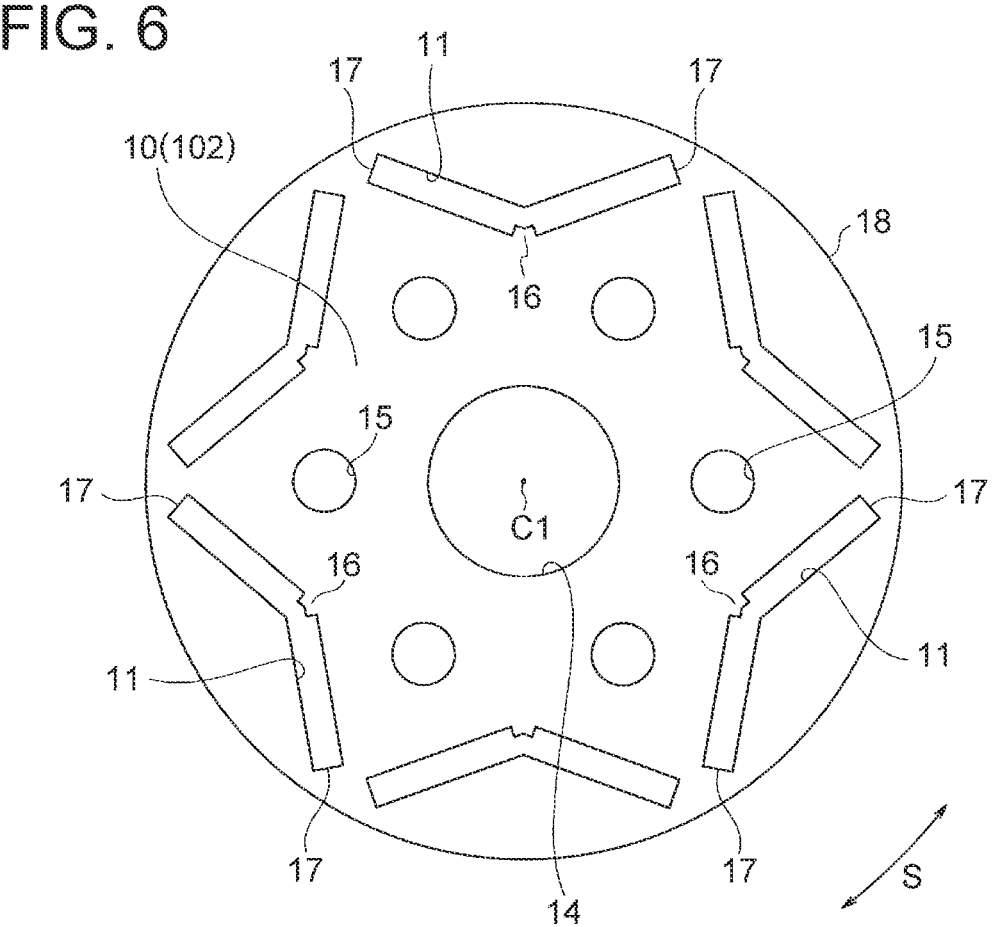
FIG. 6 is a diagram illustrating a steel lamination in a second region of a rotor core of a modification of the first embodiment.

FIG. 6 is a diagram illustrating a steel lamination 102 in a second region A2 of a rotor core 10 of a modification of the first embodiment. In the modification, each of the steel laminations 102 in the second region A2 of the rotor core 10 has no flux barrier 12 (FIG. 3) on either side of the magnet insertion hole 11 in the circumferential direction.

Thus, an opening area of the steel lamination 102 in the second region A2 of the modification is smaller than that of the steel lamination 102 in the second region A2 of the first embodiment, and thus the weight per sheet of the steel laminations 102 further increases. Consequently, the weight of the rotor core 10 can be further made heavier, and thus the inertia of the rotor core 10 can be increased.

The flux barrier 12 is provided for suppressing the short-circuit magnetic flux between adjacent magnetic poles. However, there is little disadvantage even when no flux barrier 12 is provided in the second region A2. This is because the permanent magnets 20 are not inserted in the magnet insertion holes 11 in the second region A2, and the short-circuit magnetic flux is less likely to occur in the second region A2.

The rotor core 10 of the modification is configured in the same manner as the rotor core 10 of the first embodiment except for the points described above.

Although the configuration in which the steel lamination 102 in the second region A2 has no flux barrier 12 has been described herein, this embodiment is not limited to such a configuration. For example, the steel lamination 102 may have one or more flux barriers 12, the number or area of which is smaller than that of the flux barriers 12 (FIG. 3) of the steel lamination 101 in the first region A1.

It is sufficient that at least one steel lamination 102 in the second region A2 has no flux barrier 12 or has one or more flux barriers 12, the number or area of which is smaller than that of the flux barriers 12 (FIG. 3) of each steel lamination 101 in the first region A1.

In this modification, at least one steel lamination 102 in the second region A2 of the rotor core 10 has no flux barrier 12 or has one or more flux barriers 12, the number or area of which is smaller than that of the flux barriers 12 (FIG. 3) of each steel lamination 101. Consequently, the weight of the rotor core 10 can be made further heavier, and thus the inertia of the rotor core 10 can be increased. This makes it possible to enhance the effect of stabilizing the rotation of the motor 100 against load pulsation and to thereby enhance the effect of reducing vibration and noise.

Second Embodiment

Figure 7:
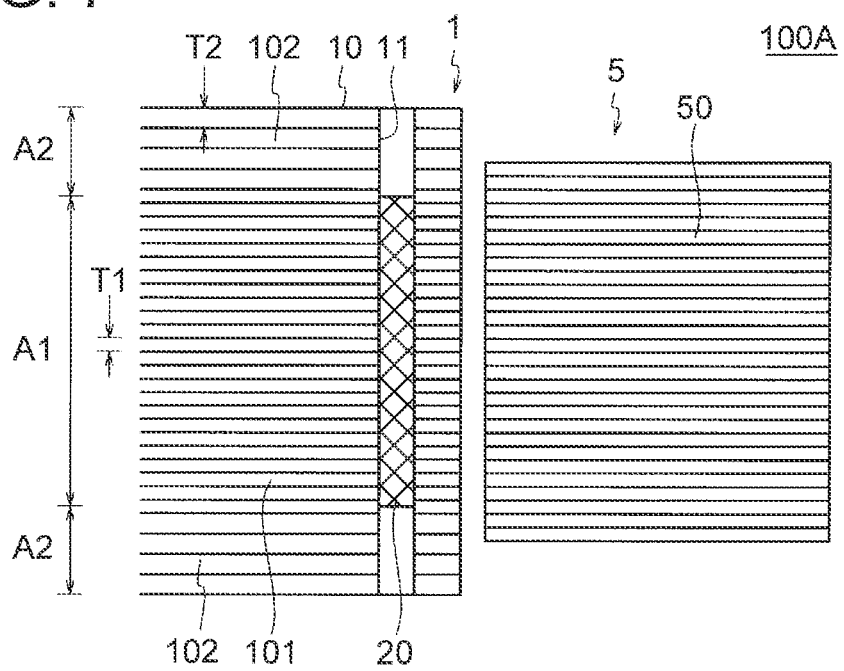
FIG. 7 is a longitudinal-sectional view illustrating a motor of a second embodiment.

FIG. 7 is a longitudinal-sectional view illustrating a motor 100 of a second embodiment. In the second embodiment, the sheet thickness of each of the steel laminations of the rotor core 10 is different between the first region A1 and the second region A2.

As illustrated in FIG. 7, the sheet thickness T2 of the steel lamination in the second region A2 of the rotor core 10 is thicker than the sheet thickness T1 of the steel lamination in the first region A1 of the rotor core 10. The shapes of the steel laminations in the first and second regions A1 and A2 of the rotor core 10 are those described with reference to FIGS. 3 and 4 in the first embodiment.

As the sheet thickness of each steel lamination decreases, the number of steel laminations constituting the stacked body for the same length in the axial direction. The number of steel laminations constituting the stacked body is referred to as a stacking number. Gaps are each famed between the steel laminations in the axial direction. Thus, as the number of the steel laminations increases, the proportion of the gaps in the stacked body increases and the weight of the stacked body decreases for the same length in the axial direction. Therefore, in order to increase the inertia, it is desirable to make the sheet thickness of the steel laminations thicker.

In the first region A1 of the rotor core 10, the amount of change in the magnetic flux due to the rotating magnetic field of the coils 6 of the stator 5 is large. In order to suppress the eddy current loss caused by the change in the magnetic flux, it is desirable to make the sheet thickness of the steel laminations thinner. In contrast, in the second region A2 of the rotor core 10, the amount of change in the magnetic flux is smaller than in the first region A1. Thus, the eddy current loss is less likely to occur in the second region A2 even when the sheet thickness of the steel laminations is made thicker.

In the second embodiment, since each sheet thickness T2 of the steel lamination 102 in the second region A2 is thicker than the sheet thickness T1 of each steel lamination 101 in the first region A1, the inertia of the rotor core 10 can be increased while suppressing an increase in the eddy current loss.

Here, the case where the sheet thickness of each steel lamination 102 in the second region A2 is thicker than the sheet thickness T1 of each steel lamination 101 in the first region A1 has been described. However, it is sufficient that the sheet thickness T2 of at least one steel lamination 102 in the second region A2 is thicker than the sheet thickness T1 of each steel lamination 101 in the first region A1.

The motor 100 of the second embodiment is configured in the same manner as the motor 100 of the first embodiment except for the points described above.

As described above, in the second embodiment, the sheet thickness T2 of at least one steel lamination 102 in the second region A2 of the rotor core 10 is thicker than the sheet thickness T1 of each steel lamination 101 in the first region A1 of the rotor core 10. Thus, the inertia of the rotor core 10 can be increased while suppressing the increase in the eddy current loss. This makes it possible to enhance the effect of stabilizing the rotation of the motor 100 against load pulsation and to thereby enhance the effect of reducing vibration and noise.

Third Embodiment

Figure 8:
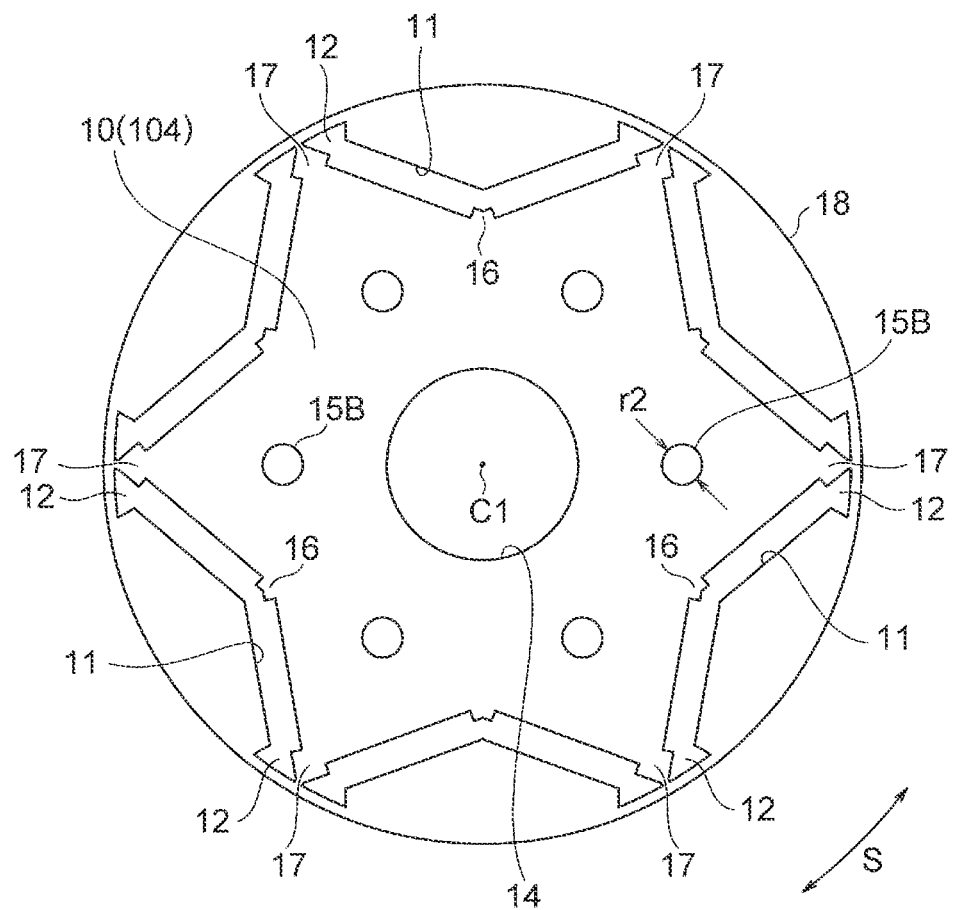
FIG. 8 is a diagram illustrating a steel lamination in a second region of a rotor core of a third embodiment.

FIG. 8 is a diagram illustrating a steel lamination 104 in a second region A2 of a rotor core 10 of a third embodiment. In the third embodiment, the inner diameter of the hole 15 (FIG. 3) of the rotor core 10 is different between the first region A1 and the second region A2.

As described above, each of the holes 15 (FIG. 3) of the rotor core 10 is famed on the inner side with respect to the magnet insertion hole 11 in the radial direction, i.e., on the center hole 14 side, and serves as a flow passage for refrigerant, for example. Each of the holes 15 (FIG. 3) of the steel lamination 101 in the first region A1 has the inner diameter r1. In contrast, each of the holes 15B of the steel lamination 104 in the second region A2 illustrated in FIG. 8 has an inner diameter r2 smaller than the inner diameter r1.

In the third embodiment, the inner diameter r2 of the hole 15B of the steel lamination 104 in the second region A2 is smaller than the inner diameter r1 of the hole 15 of the steel lamination 101 in the first region A1. In other words, the area of the holes 15B of the steel lamination 104 in the second region A2 is smaller than that of the holes 15 of the steel lamination 101 in the first region A1.

Consequently, the weight per sheet of the steel laminations 104 in the second region A2 is heavier than the weight per sheet of the steel laminations 101 in the first region A1. Thus, the inertia of the rotor core 10 can be increased.

Here, the case where the inner diameter of the hole 15B of each steel lamination 104 in the second region A2 is smaller than the inner diameter of the hole 15 of each steel lamination 101 in the first region A1 has been described. However, the number of the holes 15B of each steel lamination 104 in the second region A2 may be smaller than that of the holes 15 of each steel lamination 101 in the first region A1. Also in this case, the inertia of the rotor core 10 can be increased. That is, it is sufficient that the total area of the holes 15B of each steel lamination 104 in the second region A2 is smaller than the total area of the holes 15 of each steel lamination 101 in the first region A1.

Here, the case where the total area of the holes 15B of each steel lamination 102 in the second region A2 is smaller than the total area of the holes 15 of each steel lamination 101 in the first region A1 has been described. However, it is sufficient that the total area of the holes 15B of at least one steel lamination 102 in the second region A2 is smaller than the total area of the holes 15 of each steel lamination 101 in the first region A1.

The motor 100 of the third embodiment is configured in the same manner as the motor 100 of the first embodiment except for the points described above.

As described above, in the third embodiment, the area or number of the holes 15B of at least one steel lamination 104 in the second region A2 of the rotor core 10 is smaller than that of the holes 15 of each steel lamination 101 in the first region A1. Thus, the inertia of the rotor core 10 can be increased by increasing the weight of the rotor core 10. This makes it possible to enhance the effect of stabilizing the rotation of the motor 100 against load pulsation and to thereby enhance the effect of reducing vibration and noise.

Modification

Figure 9:
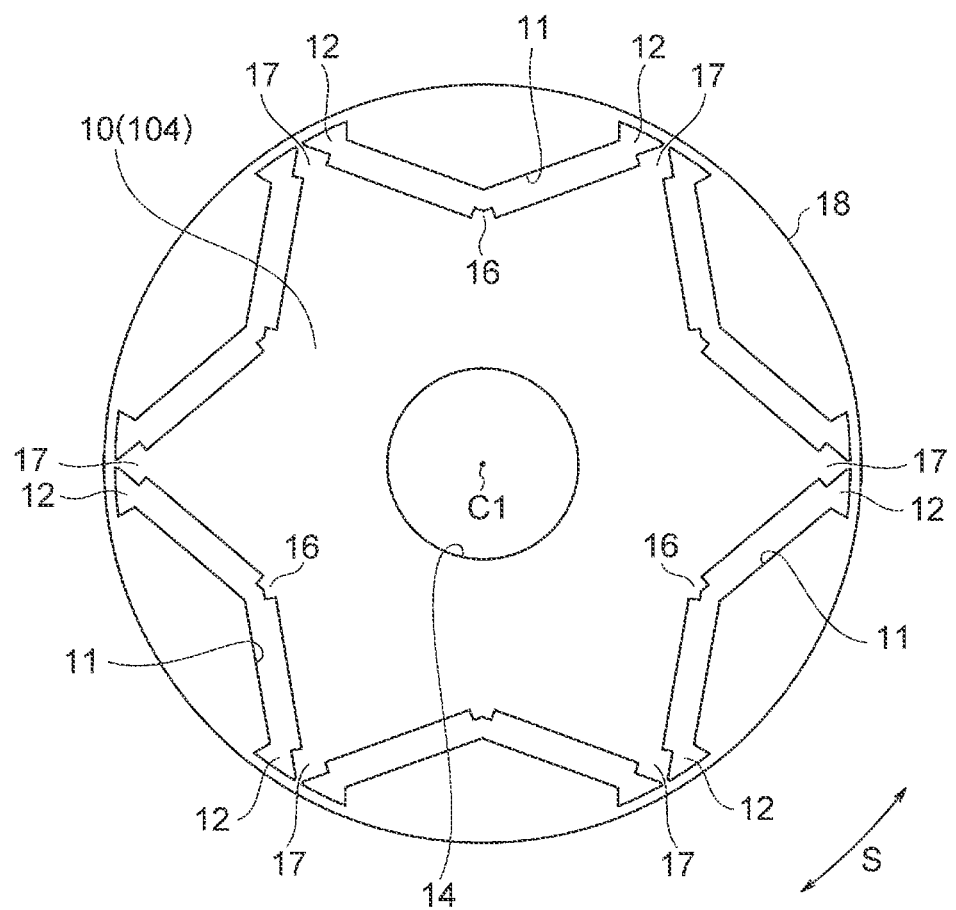
FIG. 9 is a diagram illustrating a steel lamination in a second region of a rotor core of a modification of the third embodiment.

FIG. 9 is a diagram illustrating a steel lamination 104 in a second region A2 of a rotor core 10 of a modification of the third embodiment. In the modification, the steel laminations 104 in the second region A2 have no hole 15 (FIG. 8).

Thus, an opening area of the steel lamination 104 in the second region A2 of the modification is smaller than that of the steel lamination 104 in the second region A2 of the third embodiment, so that the weight per sheet of the steel laminations 104 can be made further heavier. As a result, the weight of the rotor core 10 can be made further heavier, thereby increasing the inertia of the rotor core 10.

The rotor core 10 of the modification is configured in the same manner as the rotor core 10 of the third embodiment except for the points described above.

Although the configuration in which all the steel laminations 104 in the second region A2 have no hole 15 has been described herein, it is sufficient that at least one steel lamination 104 in the second region A2 has no hole 15.

In this modification, since at least one steel lamination 104 in the second region A2 of the rotor core 10 has no hole 15, the weight of the rotor core 10 can be made further heavier, thereby increasing the inertia of the rotor core 10. This makes it possible to enhance the effect of stabilizing the rotation of the motor 100 against load pulsation and to thereby enhance the effect of reducing vibration and noise.

Fourth Embodiment

Figure 10:
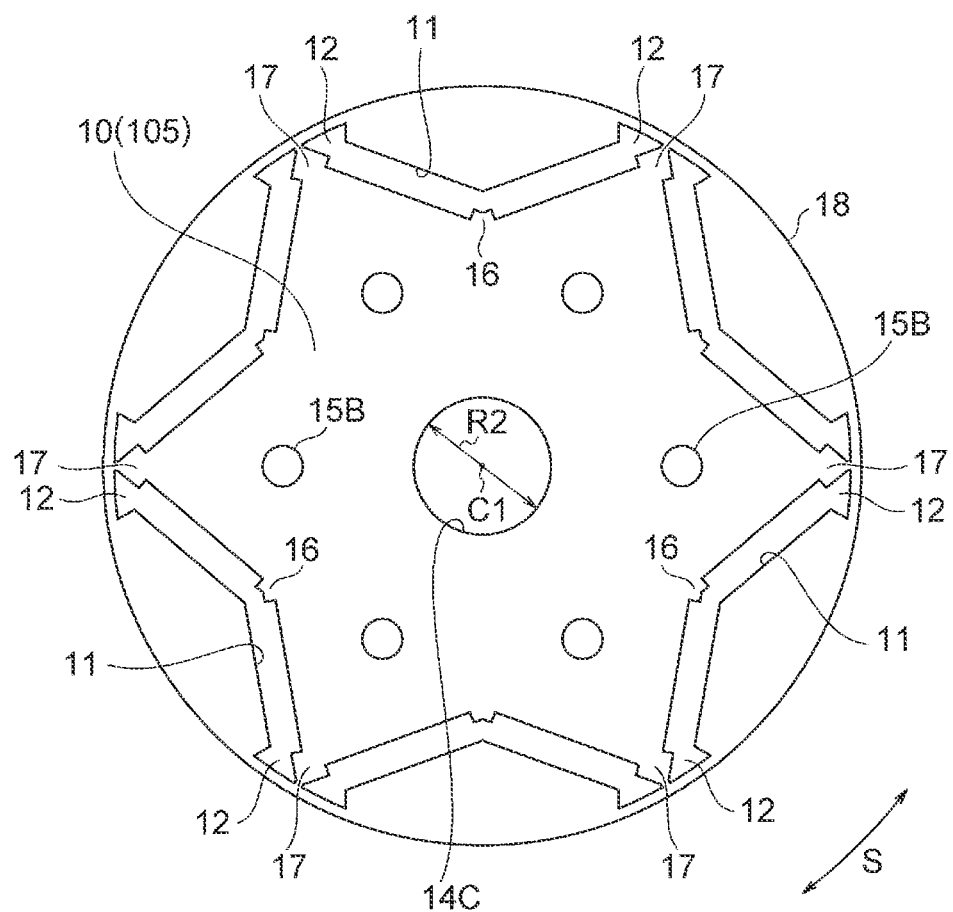
FIG. 10 is a diagram illustrating a steel lamination in a second region of a rotor core of a fourth embodiment.

FIG. 10 is a diagram illustrating a steel lamination 105 in a second region A2 of a rotor core 10 of a fourth embodiment. In the fourth embodiment, the inner diameter of the center hole 14 (FIG. 3) of the rotor core 10 is different between the first region A1 and the second region A2.

As described above, the center hole 14 (FIG. 3) is famed at the center of the rotor core 10 in the radial direction, and the shaft 21 is provided in the center hole 14. The center hole 14 (FIG. 3) of each of the steel laminations 101 in the first region A1 has the inner diameter R1. In contrast, a center hole 14C of each steel lamination 105 in the second region A2 illustrated in FIG. 10 has an inner diameter R2 smaller than the inner diameter R1.

In the fourth embodiment, the inner diameter R2 of the center hole 14C of each steel lamination 105 in the second region A2 of the rotor core 10 is smaller than the inner diameter R1 of the center hole 14 of each steel lamination 101 in the first region A1. In other words, an area of the center hole 14C of each steel lamination 105 in the second region A2 is smaller than the area of the center hole 14 of each steel lamination 101 in the first region A1.

Consequently, the weight per sheet of the steel laminations 105 in the second region A2 is heavier than the weight per sheet of the steel laminations 101 in the first region A1. Thus, the inertia of the rotor core 10 can be increased.

In this case, the shaft 21 (FIG. 1) is fitted to the center hole 14C of the steel laminations 105 in the second region A2. A gap is formed between the shaft 21 and the center hole 14 of the steel laminations 101 in the first region A1.

Although the case where the area of the center hole 14C of each steel lamination 105 in the second region A2 is smaller than the area of the center hole 14 of each steel lamination 101 in the first region A1 has been described herein, it is sufficient that the area of center hole 14C of at least one steel lamination 105 in the second region A2 is smaller than the area of the center hole 14 of each steel lamination 101 in the first region A1.

The motor 100 of the fourth embodiment is configured in the same manner as the motor 100 of the third embodiment except for the points described above.

As described above, in the fourth embodiment, the area of the center hole 14 of at least one steel lamination 105 in the second region A2 of the rotor core 10 is smaller than the area of the center hole 14 of each steel lamination 101 in the first region A1. Thus, the inertia of the rotor core 10 can be increased by increasing the weight of the rotor core 10. This makes it possible to enhance the effect of stabilizing the rotation of the motor 100 against load pulsation and to enhance the effect of reducing vibration and noise.

Fifth Embodiment

Figure 11:
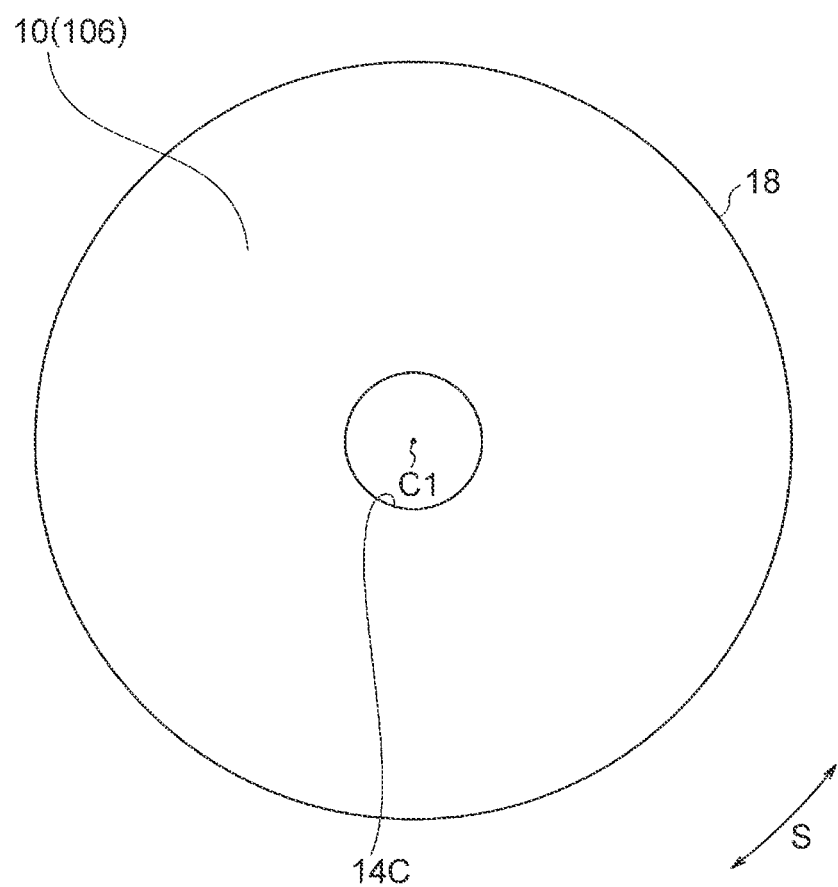
FIG. 11 is a diagram illustrating a steel lamination in a second region of a rotor core of a fifth embodiment.

FIG. 11 is a diagram illustrating a steel lamination 106 in a second region A2 of a rotor core 10 of a fifth embodiment. In the fifth embodiment, the steel laminations 106 in the second region A2 have no magnet insertion hole 11 (FIG. 3).

As described above, since the permanent magnets 20 are not inserted in the magnet insertion holes 11 in the second region A2, the configuration in which the steel laminations 106 in the second region A2 have no magnet insertion hole 11 is also implementable. In this case, the weight per sheet of the steel laminations 106 in the second region A2 is heavier than the weight per sheet of the steel laminations 101 in the first region A1. Thus, the inertia of the rotor core 10 can be increased.

In a manufacturing process of the rotor of the fifth embodiment, the permanent magnets 20 are inserted into the magnet insertion holes 11 in the first region A1 in a state where the rotor core 10 is famed midway by stacking the steel laminations in the second region A2 on the lower side in FIG. 1 and the steel laminations 101 in the first region A1. Thereafter, the steel laminations in the second region A2 on the upper side in FIG. 1 are stacked on the steel laminations in the first region A1 of the rotor core 10.

Although the case where the steel laminations 106 in the second region A2 have no magnet insertion hole 11 has been described herein, it is sufficient that at least one steel lamination 106 in the second region A2 has no magnet insertion hole 11.

The motor 100 of the fifth embodiment is configured in the same manner as the motor 100 of the fourth embodiment except for the points described above.

In the fifth embodiment described above, at least one steel lamination 106 in the second region A2 of the rotor core 10 has no center hole 14. Thus, the inertia of the rotor core 10 can be increased by increasing the weight of the rotor core 10. This makes it possible to enhance the effect of stabilizing the rotation of the motor 100 against load pulsation and to thereby enhance the effect of reducing vibration and noise.

The first to fifth embodiments and the modifications (FIGS. 6 and 9) described above can be combined as appropriate.

OTHER CONFIGURATION EXAMPLES

Figure 12:
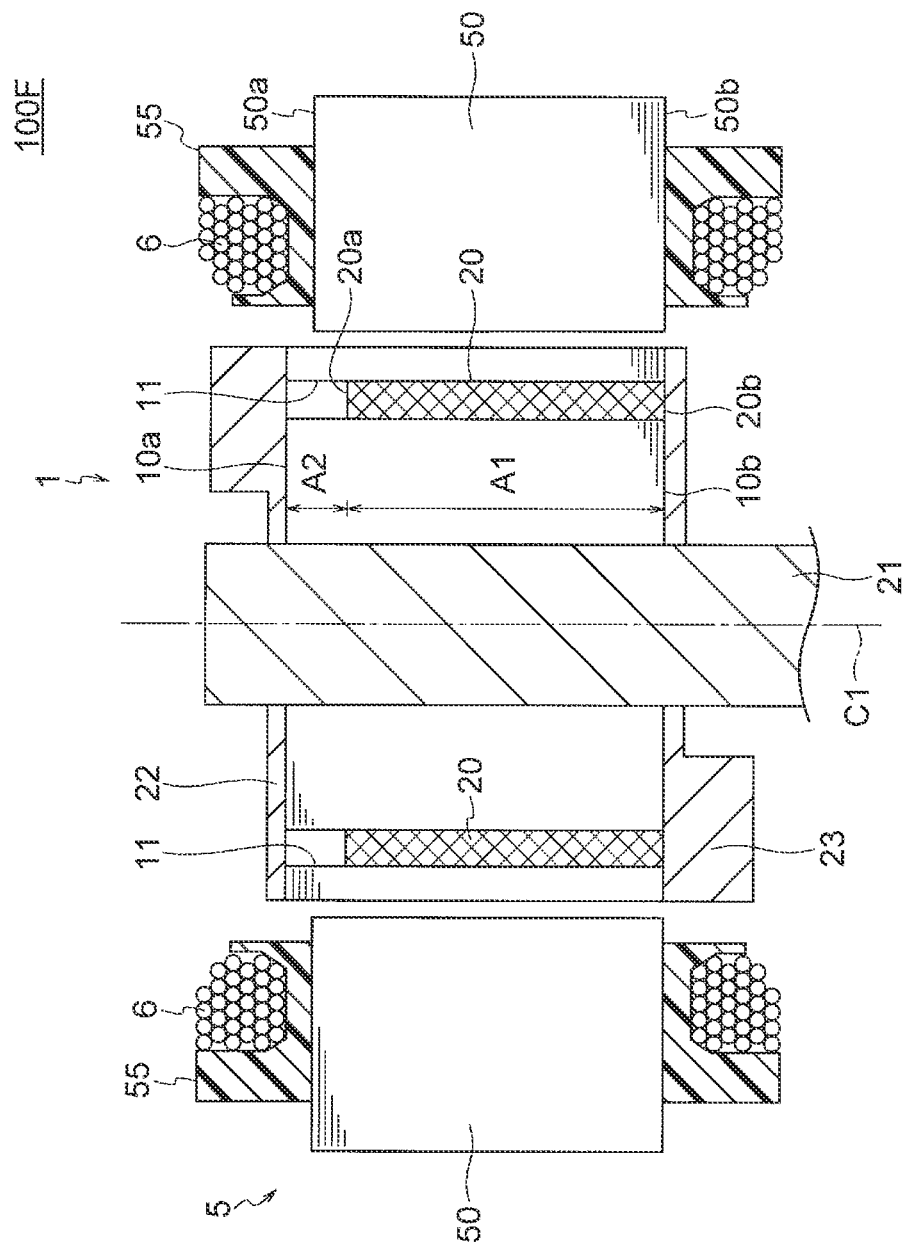
FIG. 12 is a longitudinal-sectional view illustrating a motor of a modification of each embodiment.

FIG. 12 is a cross-sectional view illustrating a motor of another configuration example which is applicable to the first to fifth embodiments and the modifications. In the first to fifth embodiments, the rotor core 10 protrudes from both sides of the stator core 50 in the axial direction, and has the second region A2 on each of both sides of the first region A1 in the axial direction.

In contrast, in the configuration example illustrated in FIG. 12, the rotor core 10 protrudes from one side of the stator core 50 in the axial direction, and has the second region A2 only on one side of the rotor core 50 in the axial direction. The opening area of at least one steel lamination in the second region A2 is smaller than the opening area of each steel lamination in the first region A1, as described in the first to fifth embodiments and the modifications.

Also in this case, since the opening area of at least one steel lamination in the second region A2 is smaller than the opening area of each steel lamination in the first region A1, the inertia of the rotor core 10 can be increased. This makes it possible to stabilize the rotation of the motor 100 against load pulsation and to thereby obtain the effect of reducing vibration and noise.

It is also possible to provide the second region A2 only on one side of the rotor core 10 in the axial direction in a configuration in which the rotor core 10 protrudes from both sides of the stator core 50 in the axial direction.

(Control System)

Figure 13:
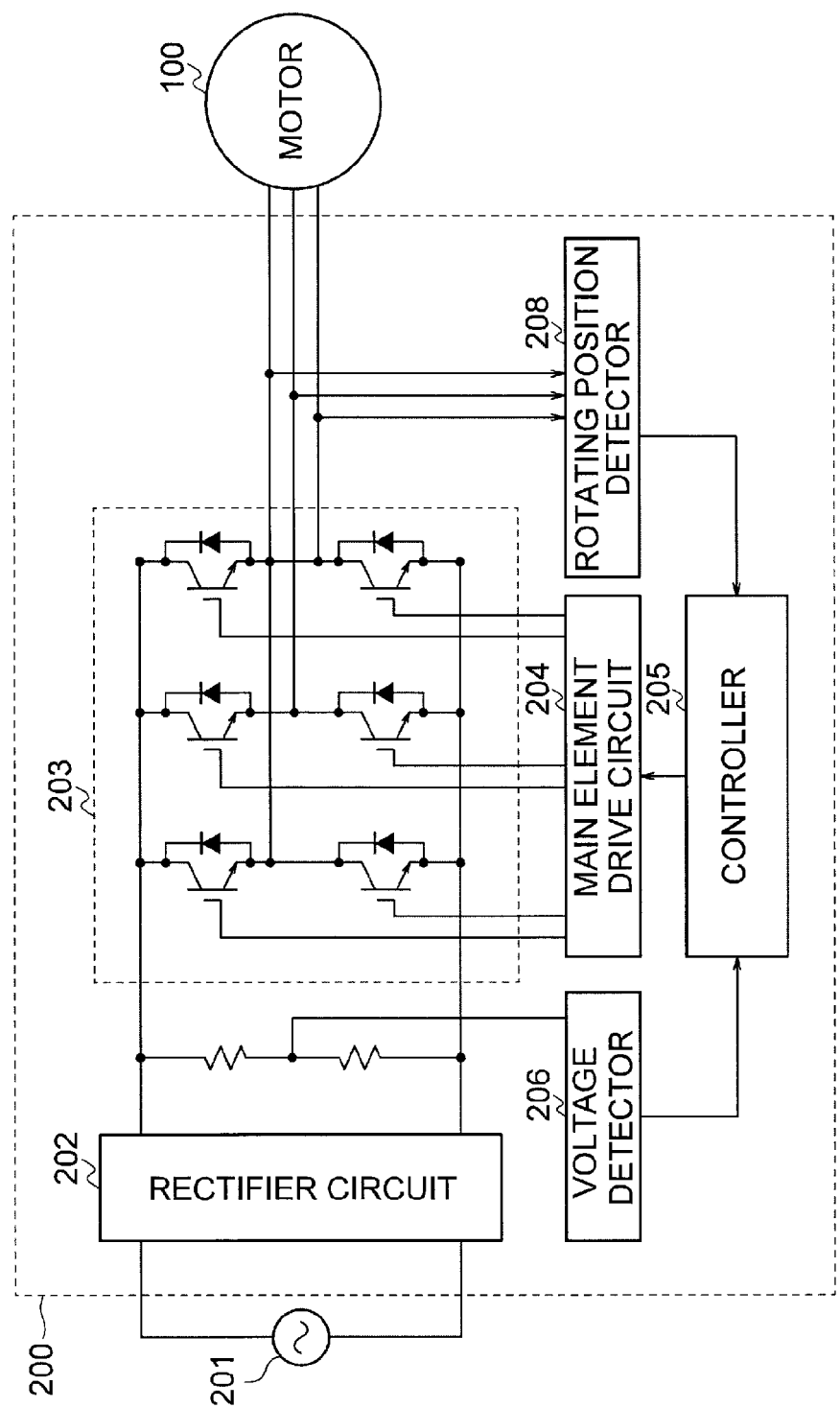
FIG. 13 is a block diagram illustrating a control system for the motor of each embodiment.

Next, a control system for the motor 100 of each of the first to fifth embodiments and the modifications will be described. FIG. 13 is a block diagram illustrating the control system for the motor 100. A drive circuit 200 that controls the motor 100 includes a rectifier circuit 202 that converts an AC voltage supplied from a commercial AC power supply 201 into a DC voltage, an inverter 203 that converts the DC voltage output from the rectifier circuit 202 into an AC voltage and supplies the AC voltage to the motor 100, and a main element drive circuit 204 that drives the inverter 203.

The drive circuit 200 also includes a voltage detector 206 that detects the DC voltage output from the rectifier circuit 202, a rotating position detector 208 that detects a terminal voltage of the motor 100 to thereby detect a position of the rotor of the motor 100, and a controller 205 that calculates an optimum output voltage of the inverter 203 and outputs a pulse width modulation (PWM) signal to the main element drive circuit 204 based on the result of calculation.

Two voltage dividing resistors connected in series are provided between the rectifier circuit 202 and the inverter 203. The voltage detector 206 samples and holds an electrical signal obtained by lowering the high DC voltage using a voltage divider circuit famed of these voltage dividing resistors.

The AC power supplied from the inverter 203 is supplied to the coils 6 of the motor 100 through the terminals 311 of a compressor 300 (FIG. 14), so that the rotor 1 rotates by the rotating magnetic field.

The rotating position detector 208 detects the rotating position of the rotor 1 and outputs the position information to the controller 205. The controller 205 calculates an optimum output voltage of the inverter 203 to be supplied to the motor 100, based on the position information of the rotor 1 and based on a target rotation speed command or information on operating conditions of the apparatus, sent from outside the drive circuit 200. Then, the controller 205 outputs the calculated output voltage to the main element drive circuit 204. A switch of the inverter 203 is switched by the main element drive circuit 204.

Variable speed drive of the motor 100 is performed under PWM control by the inverter 203 of the drive circuit 200.

When control is performed using the inverter 203, the control of load pulsation is generally difficult. However, using the motor 100 of each of the first to fifth embodiments and the modifications makes it possible to stably drive the motor 100 against load pulsation of a compression mechanism part 301.

(Configuration of Compressor)

Figure 14:
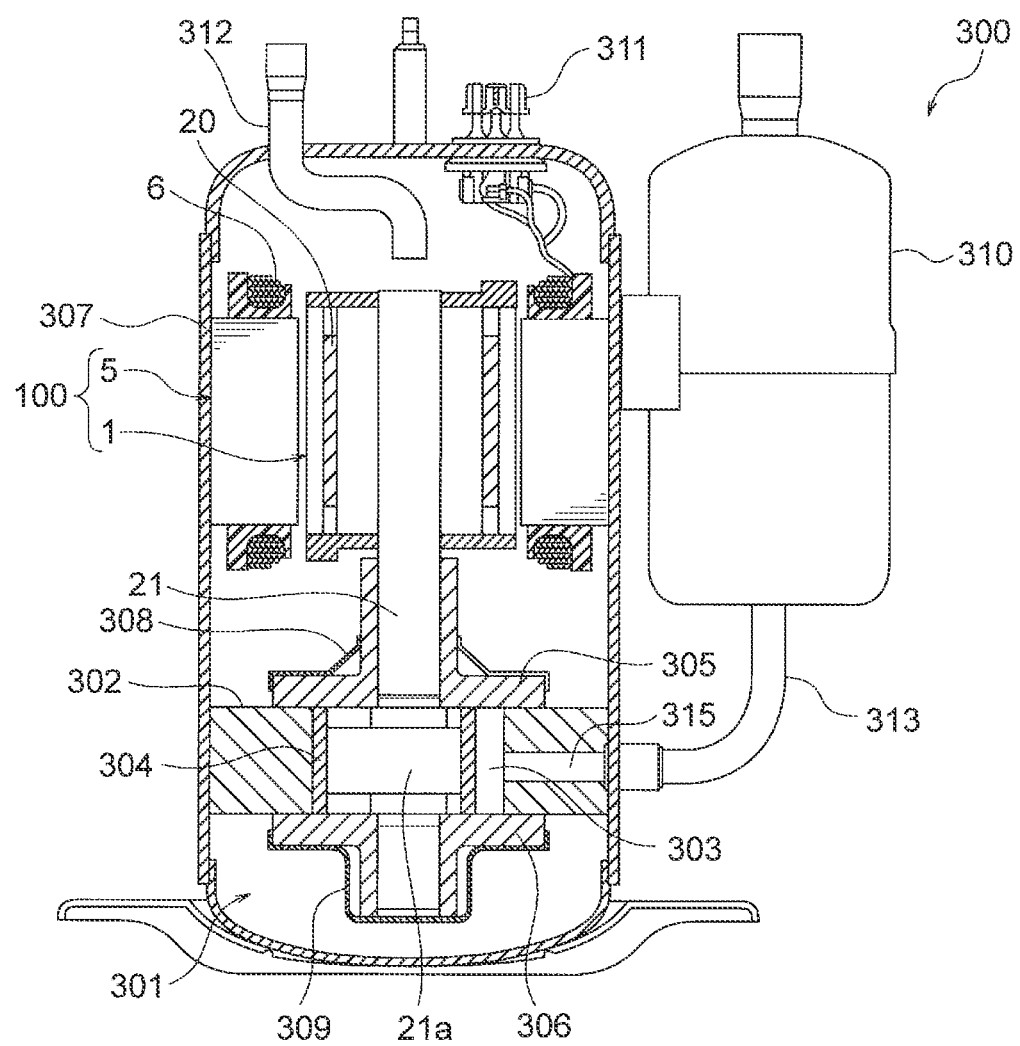
FIG. 14 is a longitudinal-sectional view illustrating a compressor to which the motor of each embodiment is applicable.
Figure 15:
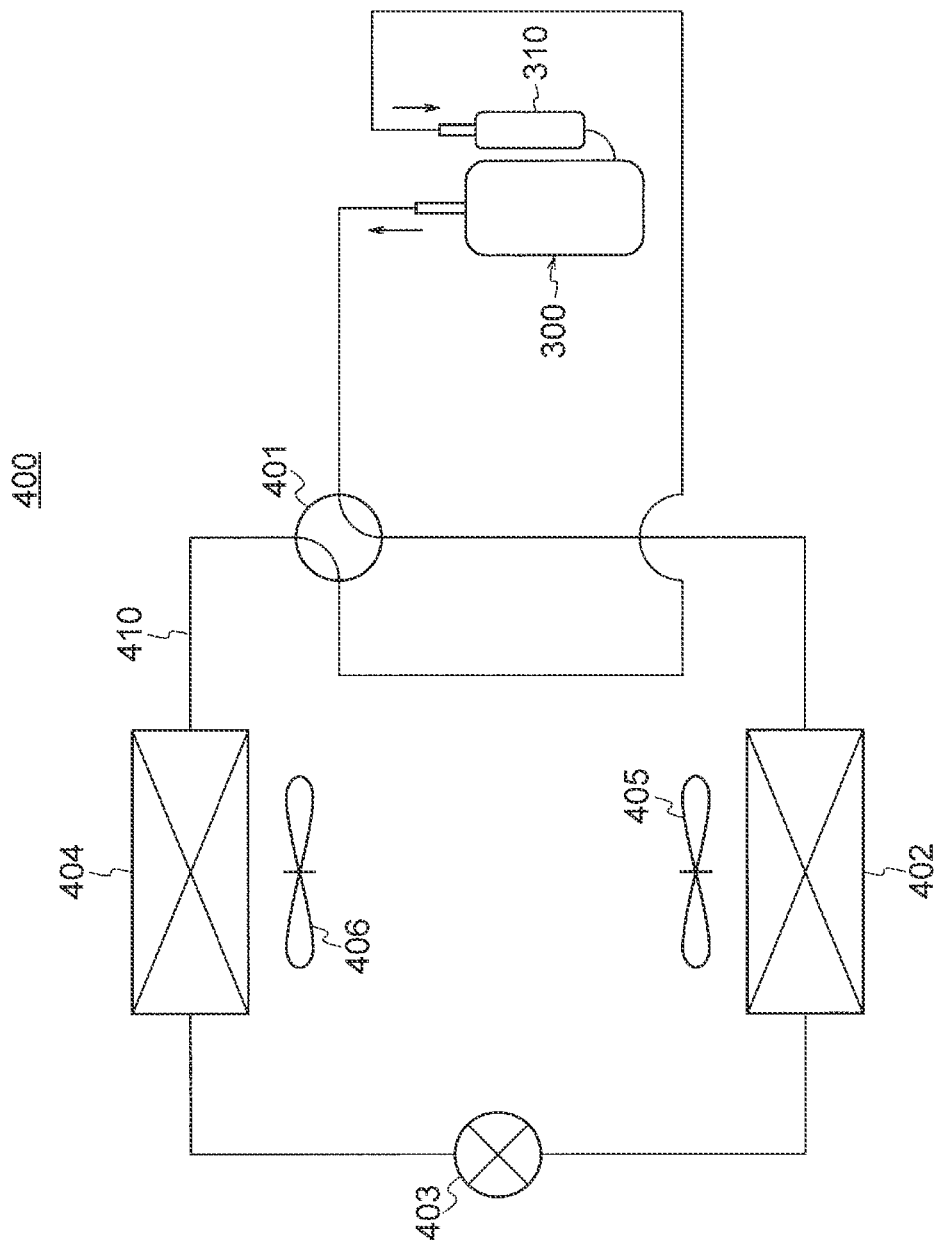
FIG. 15 is a diagram illustrating an air conditioner to which the motor of each embodiment is applicable.

Next, the compressor 300 to which the motor of each embodiment is applicable will be described. FIG. 14 is a longitudinal-sectional view illustrating the compressor 300. The compressor 300 is a rotary compressor, and is used, for example, in an air conditioner 400 (FIG. 15). The compressor 300 includes the compression mechanism part 301, the motor 100 that drives the compression mechanism part 301, the shaft 21 that connects the compression mechanism part 301 and the motor 100, and a sealed container 307 that accommodates these components. In this example, the axial direction of the shaft 21 is a vertical direction, and the motor 100 is disposed above the compression mechanism part 301.

The sealed container 307 is a container made of a steel sheet and has a cylindrical shell and a container top that covers the top of the shell. The stator 5 of the motor 100 is incorporated inside the shell of the sealed container 307 by shrink-fitting, press-fitting, welding, or the like.

The container top of the sealed container 307 is provided with a discharge pipe 312 for discharging refrigerant to the outside and terminals 311 for supplying electric power to the motor 100. An accumulator 310 that stores refrigerant gas is attached to the outside of the sealed container 307. At the bottom of the sealed container 307, refrigerant machine oil for lubricating bearings of the compression mechanism part 301 is stored.

The compression mechanism part 301 has a cylinder 302 having a cylinder chamber 303, a rolling piston 304 fixed to the shaft 21, a vane dividing the inside of the cylinder chamber 303 into a suction side and a compression side, and an upper frame 305 and a lower frame 306 which close both ends of the cylinder chamber 303 in the axial direction.

Both the upper frame 305 and the lower frame 306 have bearings that rotatably support the shaft 21. An upper discharge muffler 308 and a lower discharge muffler 309 are attached to the upper frame 305 and the lower frame 306, respectively.

The cylinder 302 is provided with the cylinder chamber 303 having a cylindrical shape about the axis C1. An eccentric shaft portion 21a of the shaft 21 is located inside the cylinder chamber 303. The eccentric shaft portion 21a has a center that is eccentric with respect to the axis C1. The rolling piston 304 is fitted to the outer circumference of the eccentric shaft portion 21a. When the motor 100 rotates, the eccentric shaft portion 21a and the rolling piston 304 rotate eccentrically in the cylinder chamber 303.

The cylinder 302 is provided with a suction port 315 through which refrigerant gas is sucked into the cylinder chamber 303. A suction pipe 313 that communicates with the suction port 315 is attached to the sealed container 307. The refrigerant gas is supplied from the accumulator 310 to the cylinder chamber 303 via the suction pipe 313.

The compressor 300 is supplied with a mixture of low-pressure refrigerant gas and liquid refrigerant from a refrigerant circuit of the air conditioner 400 (FIG. 15). If the liquid refrigerant flows into and is compressed by the compression mechanism part 301, it may cause failure of the compression mechanism part 301. Thus, the accumulator 310 separates the refrigerant into liquid refrigerant and refrigerant gas and supplies only the refrigerant gas to the compression mechanism part 301.

For example, R410A, R407C, or R22 may be used as the refrigerant, but it is desirable to use refrigerant with a low global warming potential (GWP) from the viewpoint of preventing global warming.

The operation of the compressor 300 is as follows. When current is supplied to the coils 6 of the stator 5 via the terminals 311, the attraction force and repulsive force are generated between the stator 5 and the rotor 1 by the rotating magnetic field generated by the current and the magnetic field of the permanent magnets 20 of the rotor 1, causing the rotor 1 to rotate. The shaft 21 fixed to the rotor 1 also rotates accordingly.

Low-pressure refrigerant gas is sucked from the accumulator 310 into the cylinder chamber 303 of the compression mechanism part 301 through the suction port 315. In the cylinder chamber 303, the eccentric shaft portion 21a of the shaft 21 and the rolling piston 304 attached to the shaft portion 21a rotate eccentrically, thereby compressing the refrigerant in the cylinder chamber 303.

The refrigerant compressed in the cylinder chamber 303 is discharged into the sealed container 307 through a discharge port (not shown) and the discharge mufflers 308 and 309. The refrigerant discharged into the sealed container 307 rises in the sealed container 307 through the holes 15 and the like of the rotor core 10. The refrigerant is then discharged through the discharge pipe 312 and supplied to a refrigerant circuit of the air conditioner 400 (FIG. 15).

Since the motor described in each of the first to fifth embodiments and the modifications is applicable to the compressor 300 of the air conditioner 400, vibration and noise of the compressor 300 can be suppressed.

(Air Conditioner)

Next, an air conditioner 400 (also referred to as a refrigeration air conditioning apparatus) to which the motor of each embodiment is applicable will be described. FIG. 15 is a diagram illustrating a configuration of the air conditioner 400. The air conditioner 400 includes the compressor 300, a four-way valve 401 as a switching valve, a condenser 402, a decompressor 403, an evaporator 404, and a refrigerant pipe 410 that connects these components.

The compressor 300, the condenser 402, the decompressor 403, and the evaporator 404 are connected together by the refrigerant pipe 410 to constitute a refrigerant circuit. The compressor 300 includes an outdoor fan 405 facing the condenser 402 and an indoor fan 406 facing the evaporator 404.

The operation of the air conditioner 400 is as follows. The compressor 300 compresses sucked refrigerant and sends out the compressed refrigerant as high-temperature and high-pressure refrigerant gas. The four-way valve 401 is provided for switching a flow direction of the refrigerant. During a cooling operation, the four-way valve 401 delivers the refrigerant sent from the compressor 300, to the condenser 402 as illustrated in FIG. 15.

The condenser 402 exchanges heat between the refrigerant sent from the compressor 300 and outdoor air fed by the outdoor fan 405 to condense the refrigerant and sends out the condensed refrigerant as liquid refrigerant. The decompressor 403 expands the liquid refrigerant sent from the condenser 402 and then sends out the expanded refrigerant as low-temperature and low-pressure liquid refrigerant.

The evaporator 404 exchanges heat between the low-temperature and low-pressure liquid refrigerant sent from the decompressor 403 and indoor air to evaporate (vaporize) the refrigerant, and sends out the evaporated refrigerant as refrigerant gas. Thus, air deprived of heat in the evaporator 404 is supplied by the indoor fan 406 to the interior of a room, which is a space to be air-conditioned.

During a heating operation, the four-way valve 401 delivers the refrigerant sent from the compressor 300, to the evaporator 404. In this case, the evaporator 404 functions as a condenser, and the condenser 402 functions as an evaporator.

Since the motor described in each of the first to fifth embodiments and the modifications is applicable to the compressor 300 of the air conditioner 400, vibration and noise of the compressor 300 can be suppressed. Thus, quietness of the air conditioner 400 can be enhanced.

Any components of the air conditioner 400 other than the compressor 300 are not limited to the configuration examples described above.

Although the preferred embodiments of the present invention have been described specifically, the present invention is not limited to the above described embodiments, but may be improved or modified variously within a range not departing from the gist of the present invention.

What is claimed is:

1. A motor comprising:
a stator core having an annular shape about an axis;
a coil wound on the stator core;
a rotor core disposed on an inner side of the stator core in a radial direction about the axis, the rotor core having a stacked body in which a plurality of steel laminations are stacked in a direction of the axis and a magnet insertion hole formed in the stacked body, the rotor core having a length in the direction of the axis longer than that of the stator core; and
a magnet inserted in the magnet insertion hole,
wherein the rotor core has a first region where the magnet is inserted in the magnet insertion hole and a second region where the magnet is not inserted in the magnet insertion hole, in the direction of the axis, and wherein each of the steel laminations in the first region has one or more slits on an outer side of the magnet insertion hole in the radial direction, and wherein the at least one steel lamination in the second region has no slit or has one or more slits, a number or area of which is smaller than that of the one or more slits of each of the steel laminations in the first region, on the outer side of the magnet insertion hole in the radial direction.

2. The motor according to claim 1, wherein the second region is provided on each of both sides of the first region in the direction of the axis.

3. The motor according to claim 1, wherein each of the steel laminations in the first region has one or more apertures continuous to the magnet insertion hole in a circumferential direction about the axis, and wherein the at least one steel lamination in the second region has no aperture continuous to the magnet insertion hole in the circumferential direction or has one or more apertures, a number or area of which is smaller than that of the one or more apertures of each of the steel laminations in the first region, continuous to the magnet insertion hole in the circumferential direction.

4. A motor comprising:

a stator core having an annular shape about an axis;

a coil wound on the stator core;

a rotor core disposed on an inner side of the stator core in a radial direction about the axis, the rotor core having a stacked body in which a plurality of steel laminations are stacked in a direction of the axis and a magnet insertion hole formed in the stacked body, the rotor core having a length in the direction of the axis longer than that of the stator core; and a magnet inserted in the magnet insertion hole, wherein the rotor core has a first region where the magnet is inserted in the magnet insertion hole and a second region where the magnet is not inserted in the magnet insertion hole, in the direction of the axis, and wherein each of the steel laminations in the first region has one or more holes on an inner side of the magnet insertion hole in the radial direction, and wherein the at least one steel lamination in the second region has no hole or has one or more holes, a number or area of which is smaller than that of the one or more openings of each of the steel laminations in the first region, on the inner side of the magnet insertion hole in the radial direction.

5. The motor according to claim 1, wherein each of the steel laminations in the first region has a center hole at a center of the steel lamination in the radial direction, and wherein the at least one steel lamination in the second region has a center hole having a smaller area than that of the center hole of each of the steel laminations in the first region.

6. The motor according to claim 1, wherein a thickness of the at least one steel lamination in the second region is thicker than a thickness of each of the steel laminations in the first region.

7. The motor according to claim 1, wherein the rotor core protrudes from both sides of the stator core in the direction of the axis.

8. The motor according to claim 1, wherein the motor is controlled by an inverter.

9. A compressor comprising:

the motor according to claim 1; and a compression mechanism part driven by the motor.

10. An air conditioner comprising:

the compressor according to claim 9;

a condenser to condense refrigerant sent out from the compressor;

a decompressor to decompress the refrigerant condensed by the condenser; and an evaporator to evaporate the refrigerant decompressed by the decompressor.

\* \* \* \* \*